United States Patent
Garbe et al.

(10) Patent No.: US 8,707,702 B2
(45) Date of Patent: Apr. 29, 2014

(54) METHOD AND DEVICE FOR UTILIZING HEAT TRANSPORTED BY A DISCONTINUOUS FLOW OF EXHAUST GASES

(75) Inventors: Hanno Garbe, Ariemore (GB); Jörg Lengert, Lonnerstadt-Ailsbach (DE); Thomas Matschullat, Eckental (DE)

(73) Assignee: Siemens Aktiengesellschaft, Munich (DE)

( * ) Notice: Subject to any disclaimer, the term of this patent is extended or adjusted under 35 U.S.C. 154(b) by 1178 days.

(21) Appl. No.: 12/602,861

(22) PCT Filed: May 28, 2008

(86) PCT No.: PCT/EP2008/056531
§ 371 (c)(1),
(2), (4) Date: Dec. 3, 2009

(87) PCT Pub. No.: WO2008/148674
PCT Pub. Date: Dec. 11, 2008

(65) Prior Publication Data
US 2010/0170243 A1    Jul. 8, 2010

(30) Foreign Application Priority Data
Jun. 4, 2007 (DE) .......................... 10 2007 025 978

(51) Int. Cl.
*F01K 13/02*    (2006.01)
(52) U.S. Cl.
USPC ............................................. 60/664
(58) Field of Classification Search
USPC ............. 60/659–661, 664, 670; 110/233, 234
See application file for complete search history.

(56) References Cited

U.S. PATENT DOCUMENTS 4,340,207 A * 7/1982 Bruhn et al. .................. 266/155

FOREIGN PATENT DOCUMENTS

| DE | 1008340 B | 5/1957 | ............. F27D 17/00 |
| DE | 1041651 B | 10/1958 | ............... F27D 1/22 |
| DE | 2801189 | 7/1978 | ............. F28D 19/02 |
| DE | 3606681 | 10/1986 | ............. F27D 17/00 |
| EP | 0049328 | 12/1984 | ............. F27D 17/00 |
| JP | 2001033032 A * | 2/2001 | ............. F23L 17/00 |
| RU | 2082929 C1 | 6/1997 | ............. F27D 17/00 |
| RU | 2104454 C1 | 2/1998 | ............. F27D 17/00 |
| RU | 2107972 C1 | 3/1998 | ............ H01L 21/331 |

OTHER PUBLICATIONS

International Search Report and Written Opinion for Application No. PCT/EP2008/056531 (12 pages), Aug. 14, 2008.

* cited by examiner

*Primary Examiner* — Kenneth Bomberg
*Assistant Examiner* — Jonathan Matthias
(74) *Attorney, Agent, or Firm* — King & Spalding L.L.P.

(57) ABSTRACT

In a method and a device for utilizing heat transported by a discontinuous flow of exhaust gases (1), the discontinuous flow of exhaust gases (1) is emitted in phases (P1, P2, P3, P4, P5) with, in each case, constant output values for volume flowing (Va) and temperature (Ta) from an industrial installation, particularly an industrial furnace, wherein the discontinuous flow of exhaust gases (1) is converted into a continuous working flow (2) with adjustable, constant target values for the volume flowing (Vz) and the temperature (Tz). The continuous working flow (2), with the heat contained therein, is used for the conversion of thermal energy into useful energy.

18 Claims, 3 Drawing Sheets

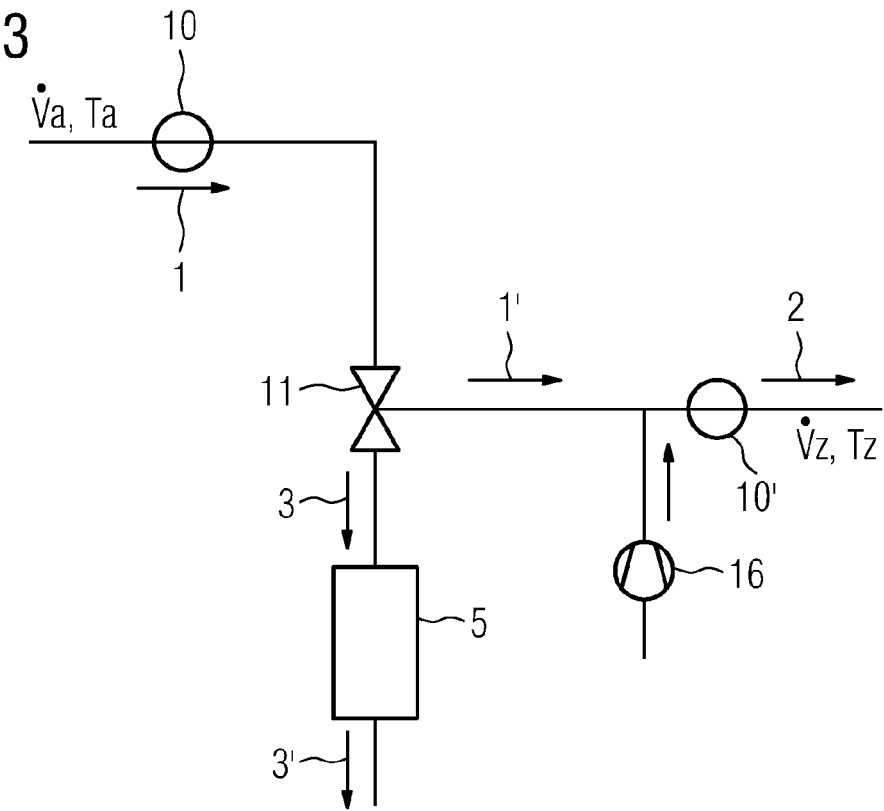
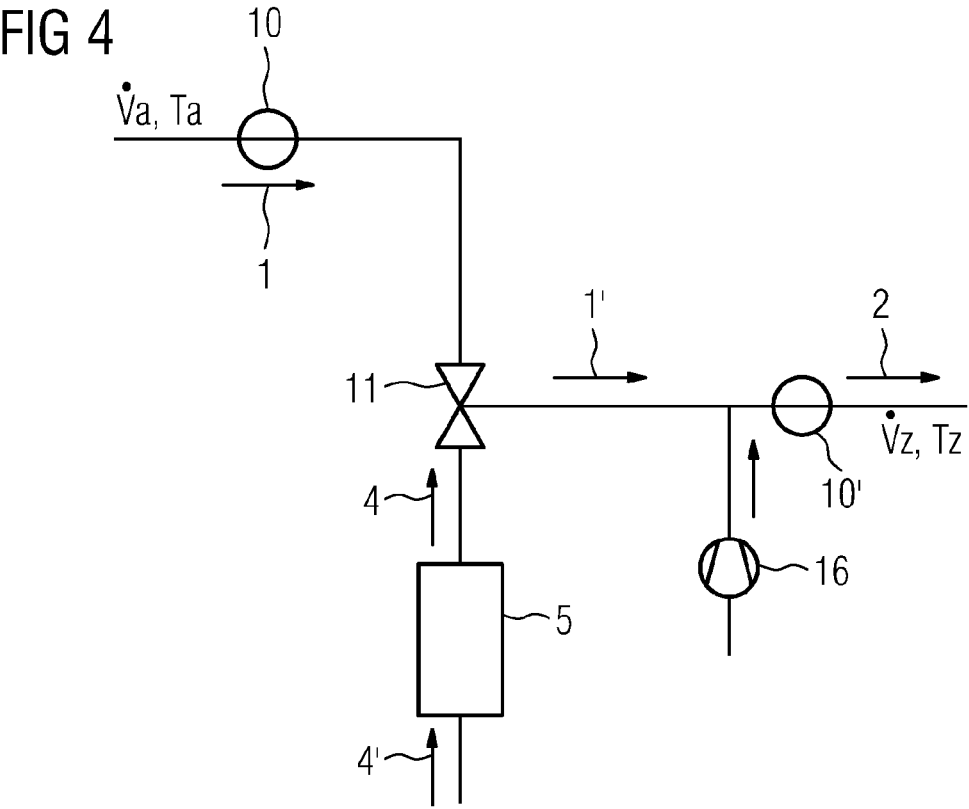

METHOD AND DEVICE FOR UTILIZING HEAT TRANSPORTED BY A DISCONTINUOUS FLOW OF EXHAUST GASES

CROSS-REFERENCE TO RELATED APPLICATIONS

This application is a U.S. National Stage Application of International Application No. PCT/EP2008/056531 filed May 28, 2008, which designates the United States of America, and claims priority to German Application No. 10 2007 025 978.8 filed Jun. 4, 2007, the contents of which are hereby incorporated by reference in their entirety.

TECHNICAL FIELD

The invention relates to a method and a device for utilizing heat transported by a discontinuous flow of waste gas.

BACKGROUND

During the operation of industrial furnaces, for example in the steel industry, high temperatures occur in the waste gas, especially during a melting process, for example in an electric arc furnace. The high waste gas temperature is cooled down in a waste gas duct or flue by means of a water cooling circuit or by introducing additional water into the mass flow of waste gas before the waste gas is passed through a filter to the environment. The cooling down of the waste gas temperature is necessary for a downstream waste gas cleaning installation, since effective cleaning can only be achieved at a certain waste gas temperature. It is disadvantageous in this respect that electrical energy has to be used for operating the cooling circuit.

The heat extracted from the flow of waste gas by means of the cooling circuit in this case remains unused, since the flow of waste gas transported by the heat is too sporadic. On account of the way in which the installation is operated, both the volume flow and the temperature of the flow of waste gas are only constant in phases. The volume flow and/or the temperature may vary greatly in the different successive operating phases. There is consequently a discontinuous flow of waste gas with regard to the heat flow, the transported thermal energy of which cannot be readily used by conventional technical equipment, such as a heat exchanger for instance.

SUMMARY

According to various embodiments, a method and a device can be provided which convert the heat transported in a discontinuous flow of waste gas into useful energy.

According to an embodiment, in a method for utilizing heat transported by a discontinuous flow of waste gas, the discontinuous flow of waste gas is discharged in phases with in each case constant starting values for the volume flow and the temperature of an industrial installation, in particular an industrial furnace, the discontinuous flow of waste gas is converted into a continuous working flow with settable constant target values for the volume flow and the temperature, and the heat that is transported in the continuous working flow being converted into useful mechanical or electrical or thermal energy.

According to a further embodiment, during a first phase, in which the starting value of the volume flow is greater than its target value, a partial flow can be removed from the flow of waste gas. According to a further embodiment, during a second phase, in which the starting value of the volume flow is less than its target value, a partial flow can be supplied to the flow of waste gas. According to a further embodiment, ambient air can be supplied to the flow of waste gas. According to a further embodiment, the removed partial flow can be directed through a heat-accumulating element and heat transported by the partial flow is thereby transferred to the element. According to a further embodiment, the partial flow to be supplied can be directed through the heat-accumulating element and the heat accumulated in the element is thereby transferred to the partial flow. According to a further embodiment, the partial flows can be directed in parallel through a number of heat-accumulating elements. According to a further embodiment, heat transported by the working flow can be transferred to a working medium, which drives an energy converter. According to a further embodiment, the working medium may circulate in a closed circuit and drives a turbine coupled to a generator.

According to another embodiment, a device for utilizing heat transported by a discontinuous flow of waste gas, wherein the discontinuous flow of waste gas being discharged in phases with in each case constant starting values for the volume flow and the temperature of an industrial installation, in particular an industrial furnace, may comprise measuring means for recording the starting values for the volume flow and the temperature of the flow of waste gas given off by the industrial installation, adjusting means for branching off or supplying a partial flow from or to the flow of waste gas, wherein the adjusting means interact with the measuring means in such a way that the flow of waste gas is converted into a continuous working flow with constant target values for the volume flow and the temperature, and means for converting heat transported in the continuous working flow into useful mechanical or electrical or thermal energy.

According to a further embodiment, the adjusting means can be formed in such a way that, during a first phase, in which the starting value of the volume flow is greater than its target value, a partial flow can be removed from the flow of waste gas and, during a second phase, in which the starting value of the volume flow is less than its target value, a partial flow can be supplied to the flow of waste gas. According to a further embodiment, supply means for supplying ambient air to the flow of waste gas can be arranged downstream of the adjusting means. According to a further embodiment, the device may have a heat-accumulating element, through which the partial flow removed from the flow of waste gas for giving off heat and the partial flow to be supplied to the flow of waste gas for taking up heat can be directed. According to a further embodiment, the means for the conversion may have a heat exchanger with a working medium, with which heat can be continuously taken up from the working flow and supplied to an energy converter for the conversion of the heat into useful energy. According to a further embodiment, the energy converter can be formed as a generator driven by a turbine, and the working medium is passed in a closed circuit through the heat exchanger and the turbine.

BRIEF DESCRIPTION OF THE DRAWINGS

An exemplary embodiment is explained in more detail below on the basis of the drawings, in which:

FIG. 3 shows a basic representation of the removal of a partial flow from the discontinuous flow of waste gas and FIG. 4 shows a basic representation of the supply of a partial flow to the discontinuous flow of waste gas.

DETAILED DESCRIPTION

Figure 1:
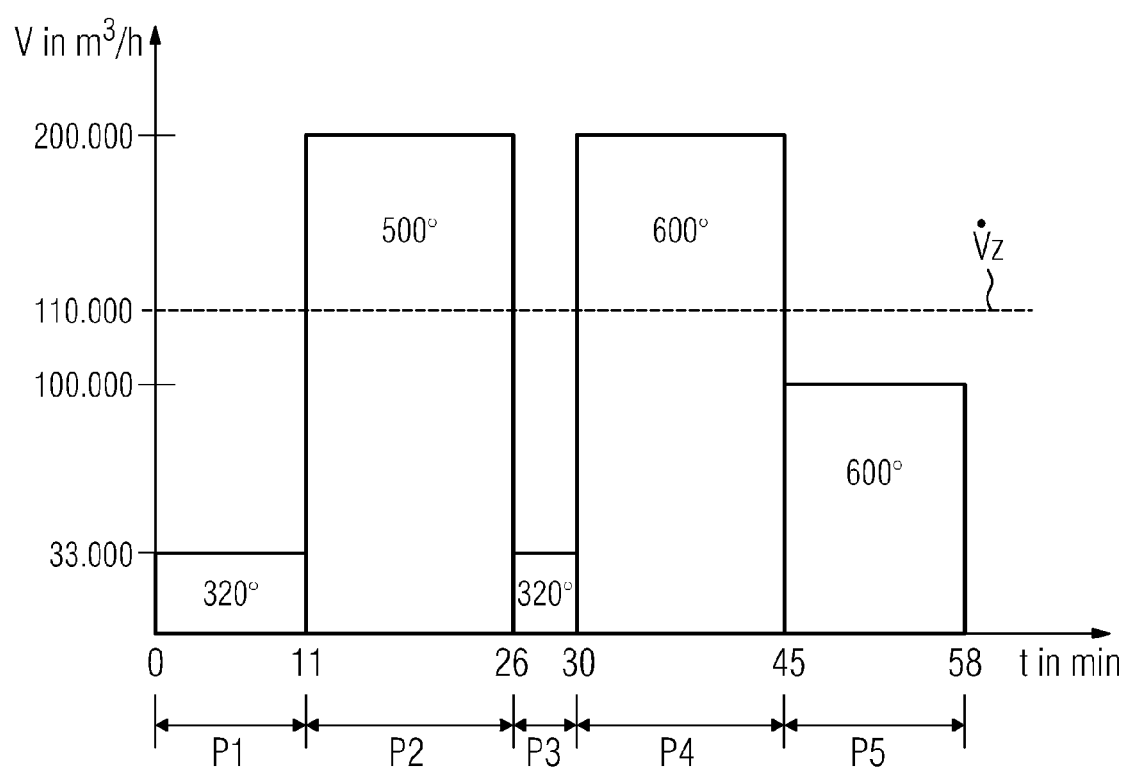
FIG. 1 shows a variation over time of a discontinuous flow of waste gas of a melting furnace in different operating phases.

According to various embodiments, the discontinuous flow of waste gas can be converted into a continuous working flow with settable constant target values for the volume flow and the temperature, the heat that is transported in the continuous working flow being converted into useful mechanical, electrical or thermal energy. The fluctuations in the volume flow and the temperature in the flow of waste gas that are produced by a change of operating phase of the furnace, and are sometimes great, are evened out in such a way that subsequent utilization of the heat transported in the flow of waste gas becomes possible. The continuous working flow obtained after the conversion, with a virtually constant volume flow and constant temperature, can then be used for converting the transported thermal energy into other forms of energy. These defined conditions make it possible, for example, to achieve an optimum design of the technical equipment used for the useful energy conversion, for example a heat exchanger.

According to a development of the method, during a first phase, in which the starting value of the volume flow is greater than its target value, a partial flow is removed from the flow of waste gas. The size of the partial flow to be removed depends in this case not only on the starting value for the volume flow but also on the temperature of the flow of waste gas in the respective operating phase of the furnace. Therefore, a proportion of the flow of waste gas that is excessive with regard to the target values for the working flow is removed in a preferably predeterminable ratio. If, for example, the starting value for the temperature is already the same as its target value, the amount removed from the volume flow is only as much as is required for its target value to be reached. If the starting value for the temperature is greater than its target value, a further proportion of the volume flow is removed in addition to the proportion removed to achieve the target value of the volume flow.

This further proportion is added again in a later method step for setting the target value for the temperature, for example as ambient air, so the target value of the volume flow is maintained.

Furthermore, during a second phase, in which the starting value of the volume flow is less than its target value, a partial flow is advantageously supplied to the flow of waste gas. The size of the partial flow to be supplied is in this case based not only on the starting value for the volume flow but preferably also on the temperature of the flow of waste gas in the operating phase of the furnace that is then in progress. If, for example, the starting value for the temperature is already equal to its target value, the amount removed from the volume flow is only as much as is required for its target value to be reached. If the starting value for the temperature is greater than its target value, less is supplied to the volume flow than is necessary for achieving its target value. In a later method step for setting the target value for the temperature, a volume flow is likewise added again to the volume flow reduced by this proportion, for example as a volume flow of cold air. In this way, the target values for the volume flow and the temperature in the working flow can be maintained.

In a refinement of the method, ambient air is supplied to the flow of waste gas. The supplying of additional ambient air is carried out after supplying or removing the partial flow. As already described, the value of the volume flow of the ambient air to be supplied, preferably cold air, is based on the value of the starting temperature, so the target temperature can be achieved by controlled mixing in of cold air. A controlling device which evaluates starting values caused by the operating phases and ensures that the target values are maintained may be advantageously enhanced for the method.

In a further advantageous refinement of the method, the removed partial flow is directed through a heat-accumulating element and heat transported by the partial flow is thereby transferred to the element. The heat previously transported by the excess volume flow is expediently accumulated in the heat-accumulating element and can be utilized for a wide range of applications in the industrial installation.

This advantageously takes place, for example, by the partial flow to be supplied being directed through the heat-accumulating element and the heat accumulated in the element is thereby transferred to the partial flow. The heat transferred in this way to the partial flow to be supplied is used to achieve the target values. Therefore, either excess heat is accumulated or required heat is given off by means of the heat-accumulating element in the various operating phases of the industrial furnace.

In terms of the method, it is also of advantage if the partial flows are directed in parallel through a number of heat-accumulating elements. For example, if the flow of waste gas contains a high thermal energy, which cannot be taken up by a single element alone, two heat-accumulating elements each take up a proportion of the thermal energy in a parallel arrangement. As a result of the multiple design of the heat-accumulating elements, the structural dimensions of each individual heat-accumulating element can be kept low. Alternatively, a third heat-accumulating element may be provided for reasons of availability, so that for example there is a possibility of selecting two out of three.

For an advantageous way of providing the useful energy, the heat transported by the working flow is transferred to a working medium, which drives an energy converter. A heat exchanger is used for the transfer of the heat transported in the working flow to the working medium, making it possible by means of the working medium to convert thermal energy into mechanical energy or into heating energy for a building.

The working medium expediently circulates in a closed circuit and drives a turbine coupled to a generator. In this way, the previously unused thermal energy of discontinuous flows of waste gas can be advantageously converted into electrical energy.

The object in terms of the device is achieved by a device for utilizing heat transported by a discontinuous flow of waste gas, the discontinuous flow of waste gas being discharged in phases with in each case constant starting values for the volume flow and the temperature of an industrial installation, in particular an industrial furnace, comprising measuring means for recording the starting values for the volume flow and the temperature of the flow of waste gas given off by the industrial installation, adjusting means for branching off or supplying a partial flow from or to the flow of waste gas, wherein the adjusting means interact with the measuring means in such a way that the flow of waste gas is converted into a continuous working flow with constant target values for the volume flow and the temperature, and means for converting heat transported in the continuous working flow into useful mechanical or electrical or thermal energy. Here, the measuring means are arranged upstream in the direction of flow of the adjusting means for removing or supplying a partial flow and determine the starting values for the volume flow and the temperature of the discontinuous flow of waste gas, and consequently record which operating phase of the industrial installation is in progress at a given time or whether a change of phase is taking place. With the values determined, the adjusting means can be controlled by means of a closed-loop or open-loop control device, for example a programmable controller, phase-dependently to achieve the continuous flow of waste gas.

The adjusting means are expediently formed in such a way that, during a first phase, in which the starting value of the volume flow is greater than its target value, a partial flow can be removed from the flow of waste gas and, during a second phase, in which the starting value of the volume flow is less than its target value, a partial flow can be supplied to the flow of waste gas. The adjusting means are in this case preferably formed as electrically controllable valves or dampers, which are arranged in pipelines or in waste gas shafts or ducts. The measuring means are designed, for example, as a temperature sensor and as a flow sensor, which are connected to the programmable controller. The measured values can be evaluated by means of a control algorithm implemented in the programmable controller, and the programmable controller can pass on corresponding adjusting values to the servomotors assigned to the valves or dampers, so that the target values for the temperature and the volume flow can be set.

In an advantageous development, supply means for supplying ambient air to the flow of waste gas are arranged downstream of the adjusting means. By specific admixing of cold air, for example, to the flow of waste gas downstream of the adjusting means, a further setting can preferably be performed for the temperature value. If, for example, the temperature of the remaining flow of waste gas is still greater than the target value of the working flow, it can be brought to its target value by adding cold air, for example by means of a motor-driven compressor arranged in a supply line.

The device expediently has a heat-accumulating element, through which the partial flow removed from the flow of waste gas for giving off heat and the partial flow supplied to the flow of waste gas for taking up heat can be directed. The heat-accumulating element is preferably a bulk material regenerator. It is possible by means of this bulk material regenerator for the heat to be temporarily accumulated and given off again as and when required.

In an advantageous development of the device, the means for the conversion are formed as a heat exchanger with a working medium, with which heat can be continuously taken up from the working flow and supplied to an energy converter for the conversion of the heat into useful energy. By means of the heat exchanger, also known as a recuperator, an indirect heat transfer preferably takes place from the working flow to the working medium, the flow of waste gas being spatially separated from the working medium by a heat-transmitting wall. Mixing of waste gas with the working medium is avoided in this way.

The energy converter is expediently formed as a generator driven by a turbine and the working medium is passed in a closed circuit through the heat exchanger and the turbine. Uniformly heated-up working medium can then drive the turbine, and consequently the generator, with a rotational speed that is constantly the same, so that speed fluctuations in the power generation can be advantageously avoided.

FIG. 1 shows the variation over time of the volume flow of a discontinuous flow of waste gas (hereafter denoted by 1 with reference to FIG. 2), as may occur during the operation of an electric arc furnace in a steelworks. In accordance with the different operating phases of the furnace, the flow of waste gas has different volume flows and waste gas temperatures in successive operating phases P1 to P5, which however are constant during an operating phase.

During a first operating phase P1, liquid steel is tapped off and a first scrap basket is refilled. In this phase P1, lasting 11 minutes, the flow of waste gas 1 has a volume flow Va of 33,000 $m^3/h$ at a temperature Ta of 320° C.

During the subsequent second operating phase P2, a first melting operation takes place, the change to this second operating phase P2 being evident from a sudden increase in the volume flow $\dot{V}a$ and the temperature Ta. In the second operating phase P2, the flow of waste gas 1 has a volume flow $\dot{V}a$ of 200,000 $m^3/h$ at a temperature Ta of 500° C. during a time period of 15 minutes.

The second operating phase P2 is followed by the third operating phase P3, likewise with a sudden change in the volume flow $\dot{V}a$ and the temperature Ta, for a time period of 4 minutes, during which a second scrap basket is loaded. The starting values of the flow of waste gas 1 or of the temperature Ta and the volume flow $\dot{V}a$ correspond to those of the first operating phase P1.

The third operating phase P3 is followed by the fourth operating phase P4, once again with a sudden change in the volume flow $\dot{V}a$ and the temperature Ta, during which the first stage of a second melting operation takes place. In the fourth operating phase P4, the flow of waste gas 1 has a volume flow $\dot{V}a$ of 200,000 $m^3/h$ at a temperature Ta of 600° C. over a time period of 15 minutes.

The end of the fourth operating phase P4 is followed by the fifth operating phase P5, once again with a sudden change, which corresponds to a second stage of the second melting operation. The starting value of the volume flow $\dot{V}a$ has a value of 100,000 $m^3/h$ at a temperature Ta of 600° C. in the fifth operating phase P5, which lasts 13 minutes.

The five operating phases P1 to P5, with starting values for the volume flow $\dot{V}a$ and the temperature Ta that are constant in each phase, therefore form the discontinuous flow of waste gas 1. According to various embodiments, the discontinuous flow of waste gas 1 is converted into a continuous working flow 2 (cf. FIG. 2) with an approximately constant target value for the volume flow $\dot{V}z$ of 110,000 $m^3/h$ and a target value for the temperature Tz of 320° C. With these constant target values, electrical energy is generated with the aid of a heat exchanger 15, as described in FIG. 2.

Figure 2:
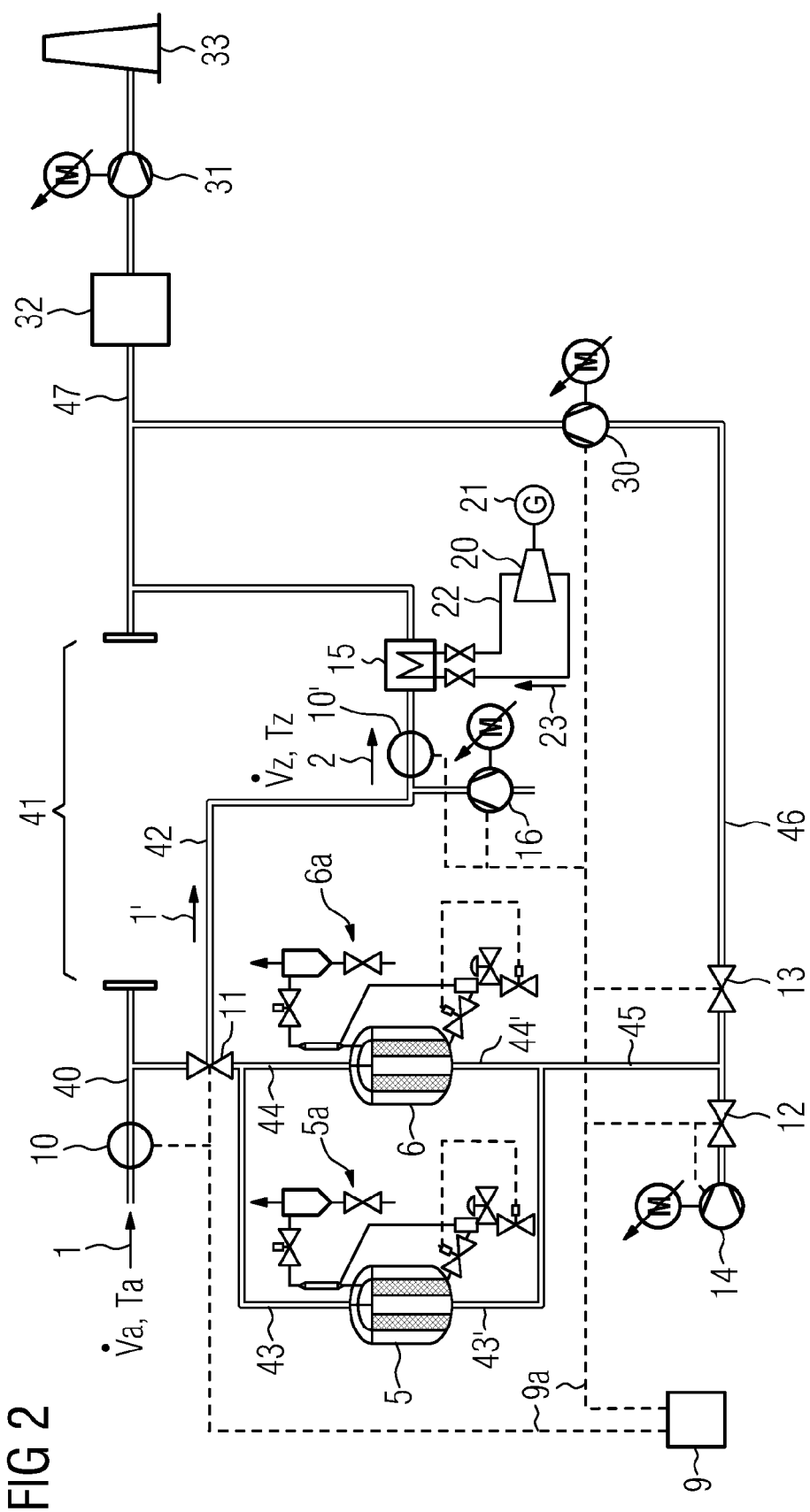
FIG. 2 shows a device for converting the discontinuous flow of waste gas into a continuous working flow for generating electrical energy.

FIG. 2 shows a device for converting the flow of waste gas 1, which is discontinuous with regard to its starting values for the volume flow $\dot{V}a$ and the temperature Ta in the different operating phases P1 to P5, into the continuous working flow 2 with approximately constant target values for the volume flow $\dot{V}z$ and the temperature Tz.

The flow of waste gas 1 leaving the furnace is directed past measuring means 10 to adjusting means 11 by way of a waste gas supply 40, formed as a pipeline. The measuring means 10 are formed as a temperature sensor and as a flow meter and are arranged in the waste gas supply 40. The current starting values for the volume flow $\dot{V}a$ and the temperature Ta are determined by way of the measuring means 10 and transmitted to a programmable controller 9 by way of a bus system 9a. In dependence on the current starting values for the volume flow $\dot{V}a$ and the temperature Ta, the adjusting means 11, a first valve 12, a second valve 13 and a compressor 14 are set by way of the programmable controller 9 such that a partial flow can be removed from the flow of waste gas 1 or a partial flow can be supplied to the flow of waste gas 1. The adjusting means 11 are in connection with the waste gas supply 40, a pipeline 42 and pipes 43, 44. The pipeline 42 leads from the adjusting means 11 to a point at which the pipeline 42 is connected to supply means 16. By way of the supply means 16, additional cold air can be fed into the pipeline 42 by means of a motor-driven compressor. Arranged along the further course of the pipeline 42 are further measuring means 10' for recording the target values for the volume flow $\dot{V}z$ and the temperature Tz of the working flow 2 that is present in this part of the pipeline 42. For the transmission of the measured target values for the volume flow $\dot{V}z$ and the temperature Tz, the measuring means 10' are connected by way of the bus system 9a to the programmable controller 9. Downstream of the measuring means 10', a heat exchanger 15 is arranged on the pipeline 42.

After the heat exchanger 15, the pipeline 42 leads into a waste gas discharge 47, with which the working flow 2 comprising waste gas is supplied to the input of a flue gas cleaning facility 32. The output of the flue gas cleaning facility 32 is in connection with a suction extraction device 31. Connected downstream of the suction extraction device 31 is a chimney 33.

The pipes 43 and 44 each connect the adjusting means 11 to a respective input of two heat-accumulating elements 5, 6, the pipes 43, 44 serving for passing on transported heat of the partial flow removed by the adjusting means 11 through the heat-accumulating elements 5 and 6. For supplying a partial flow to the adjusting means 11, which is then passed in the opposite direction through the heat-accumulating elements 5, 6, the pipes 43, 44 are likewise used.

Further pipes 43', 44' connect the outputs of the heat-accumulating elements 5, 6 to a pipe 45. The pipe 45 is connected to a removal pipe 46. The removal pipe 46 has the first valve 12 and the second valve 13, respectively on the left and right of the connecting point of the pipe 45 to the removal pipe 46.

When a partial flow that has been removed by way of the adjusting means 11 is directed through the heat-accumulating elements 5, 6, the first valve 12 is in a closed position and the second valve 13 is in an open position. By way of the second valve, the partial flow cooled by giving off heat to the heat-accumulating elements 5, 6 is directed by means of the removal pipe 46 via a suction extraction device 30 into the waste gas discharge 47.

The supplying of ambient air to the adjusting means 11 takes place by way of the compressor 14, which is arranged at one end of the removal pipe 46 upstream of the first valve 12. The first valve 12 is in this case in an open position and the second valve 13 is in a closed position.

The heat exchanger 15 is in connection with the pipeline 42 for the heat transfer of the thermal energy carried by the continuously present working flow 2 to the heat exchanger 15. Before the heat is given off to the heat exchanger 15, the temperature Tz of the working flow 2 is about 320° C., the residual temperature after it has been given off is about 100° C.

For the conversion of the thermal energy into electrical energy, the heat exchanger 15 is connected to a closed circuit 22. Circulating in the closed circuit 22 is a working medium 23, which is uniformly heated by means of the heat exchanger 15 and the then continuously present working flow 2. The working medium 23 in turn drives a turbine 20, which is coupled to a generator 21 for the power generation.

The device that is shown in FIG. 2 is designed for the purpose of converting the flow of waste gas 1, which is described in FIG. 1 and is discontinuously present, into a continuous working flow 2 with approximately constant target values for the volume flow $\dot{V}z$ and for the temperature Tz.

According to the prior art, in the region 41 there ran a waste gas duct, symbolically depicted by two delimiting lines, in which the hot flow of waste gas 1 was cooled down, in order to be subsequently supplied to the downstream flue gas cleaning facility 32. During this cooling down, the thermal energy transported in the flow of waste gas 1 was not previously utilized.

With the device according to various embodiments, the previous waste gas duct 41 is advantageously replaced or significantly reduced in its spatial extent. The previous cooling water costs, for example for water treatment, in the case of operation of a cooling tower, likewise no longer arise.

If bulk material regenerators are used for the heat-accumulating elements 5 6, the bulk material regenerators can also be advantageously used as dust filters. With a reduction in the dust content of the flow of waste gas 1, it would even be possible in some cases to dispense with the downstream flue gas cleaning facility 32. Existing flue gas cleaning installations may even be completely switched off or operate only in a part-load range for a further downstream secondary dust removal.

In the case of bulk material regenerators, the accumulated dust can be discharged during operation, by circulating the bulk material by means of the cleaning devices 5a, 6a. Since the dust deposition settles in the first 5 to 10 cm of a bed of bulk material, only this lower layer is freed of dust deposits for cleaning. Installation of an additional grating at a distance of 5 to 10 cm from the bottom of the bulk material regenerator prevents residual bulk material of the bulk material regenerator from slipping down during cleaning of the lower zone. Cleaning circulation of the bulk material may take place by means of compressed air.

The basic principle of the removal and supply of the partial flow from or to a flow of waste gas 1 is explained on the basis of FIGS. 3 and 4. The starting values for the volume flow $\dot{V}a$ and the temperature Ta are recorded by way of measuring means 10. In the event that the current starting value of the volume flow A is greater than the desired target value of the volume flow $\dot{V}z$, as is the case in the operating phase P2 that is shown in FIG. 1, a partial flow 3 is removed from the flow of waste gas 1, so that the remaining volume flow of the flow of waste gas 1' corresponds approximately to the target value $\dot{V}z$. The removed partial flow 3 is passed through the heat-accumulating element 5 to give off heat to the element 5. The correspondingly cooled partial flow 3' is directed out of the heat-accumulated element 5.

The volume flow in the partial flow 3 to be removed is based not only on the starting value for the volume flow $\dot{V}a$ but also on the starting value of the temperature Ta of the flow of waste gas 1 in the various operating phases of the furnace. If the starting value for the temperature Ta is already equal to its target value Tz, the amount removed from the volume flow 1 is only as much as is required for the target value for the volume flow $\dot{V}z$ to be reached. If the starting value for the temperature Ta is greater than its target value Tz, a further proportion of volume flow is removed from the flow of waste gas 1 in addition to the proportion removed to achieve the target value of the volume flow $\dot{V}z$. This further proportion is added again to the flow of waste gas 1' by way of the supply means 16 to set the target value for the temperature Tz. The target value of the volume flow $\dot{V}z$ in the working flow 2 is in this way maintained. The target values are recorded downstream of the supply means 16 by means of the measuring means 10'.

In the event that the starting value of the volume flow $\dot{V}a$ is less than the target value of the volume flow $\dot{V}z$, a partial flow 4 should be supplied to the flow of waste gas 1 by way of the adjusting means 11, which is illustrated in FIG. 4. To achieve the target value $\dot{V}z$ of the working flow 2, a partial flow 4, which is passed through the heat-accumulating element 5, is supplied to the flow of waste gas 1 by way of the adjusting means 11. The partial flow 4' of lower temperature, which is removed from the ambient air, becomes a partial flow 4 with an increased temperature as it is directed through the heat-accumulating element 5. This additional heat transported by the partial flow 4 is supplied to the flow of waste gas 1 to achieve the target temperature Tz, so that the sum of the partial float 4 and the flow of waste gas 1 corresponds to the further flow of waste gas 1' with approximately achieved target values for the volume flow $\dot{V}z$ and the temperature Tz.

It is also the case here that, if the starting value for the temperature Ta is already equal to its target value Tz, the amount supplied to the volume flow 1 is only as much as is required for the target value for the volume flow $\dot{V}z$ to be reached. However, this presupposes that the temperature of the supplied partial flow 4 is at the temperature Tz of the target value. If the starting value for the temperature Ta is greater than its target value Tz, less volume flow is supplied to the flow of waste gas 1 by way of the adjusting means 11 than is necessary to achieve the target value for the volume flow $\dot{V}z$. The volume flow of the flow of waste gas 1' reduced by this proportion is likewise added again as cold air by way of the supply means 16 to achieve the target value for the temperature Tz. In this way, the target values for the volume flow $\dot{V}a$ and the temperature Tz in the working flow can be set. Depending on the available temperature in the supplied partial flow 4, the target temperature Tz is set by correspondingly supplying cold air by way of the supply means 16, the volume flows comprising the flow of waste gas 1, the partial flow 4 and the cold air flow together producing the target value $\dot{V}z$. It may also happen that the temperature Ta of the flow of waste gas 1 already significantly exceeds the target temperature Tz; in this case, it is not necessary to supply the partial flow 4. The target values for the temperature Tz and volume flow $\dot{V}z$ can then be achieved just by adding cold air by way of the supply means 16.

According to various embodiments, the following may furthermore be provided: to ensure continuous operation of the turbine 20 and of the generator 21, a third bulk material regenerator may be provided as a reserve regenerator in addition to the two bulk material regenerators 5, 6 operated in parallel. In the event that one bulk material regenerator fails, the reserve generator can be made to take its place virtually without any interruption and the conversion into a continuous working flow continues to be ensured, and consequently so too does continuous power generation.

What is claimed is:

1. An industrial system comprising:
   a furnace discharging a discontinuous flow of waste gas in phases with in each case constant starting values for the volume flow and for the temperature of an industrial installation,
   a flow adjuster for converting the discontinuous flow of waste gas into a continuous working flow with settable constant target values for the volume flow and the temperature, and
   a heat converter for converting the heat that is transported in the continuous working flow into useful mechanical or electrical or thermal energy,
   further comprising a flow control system configured to remove a partial flow from the flow of waste gas during a first phase in which the starting value of the volume flow is greater than its target value, and to supply a partial flow to the flow of waste gas during a second phase in which the starting value of the volume flow is less that its target value.

2. The system according to claim 1, further comprising a compressor supplying ambient air to the flow adjuster.

3. A device for utilizing heat transported by a discontinuous flow of waste gas, the discontinuous flow of waste gas being discharged in phases with in each case constant starting values for the volume flow and the temperature of an industrial installation, the device comprising:
   a flow sensor for measuring the starting value for the volume flow of waste gas given off by the industrial installation,
   a temperature sensor for measuring the starting value for the temperature of the flow of waste gas given off by the industrial installation,
   a flow control system for branching off or supplying a partial flow from or to the flow of waste gas, wherein the flow control system uses data provided by the flow sensor and the temperature sensor to control the flow of waste gas to provide a continuous working flow with constant target values for the volume flow and the temperature, and
   a heat exchanger for converting heat transported in the continuous working flow into useful mechanical or electrical or thermal energy,
   further comprising the flow control system configured to remove a partial flow from the flow of waste gas during a first phase in which the starting value of the volume flow is greater than its target value, and to supply a partial flow to the flow of waste gas during a second phase in which the starting value of the volume flow is less that its target value.

4. The device according to claim 3, further comprising a supply of ambient air configured to be added to the flow of waste gas arranged downstream of the flow control system.

5. The device according to claim 3, further comprising a heat-accumulating element, through which the partial flow removed from the flow of waste gas for giving of heat and the partial flow to be supplied to the flow of waste gas for taking up heat can be directed.

6. The device according to claim 3, wherein the heat exchanger includes a working medium, with which heat can be continuously taken up from the working flow and supplied to an energy converter for the conversion of the heat into useful energy.

7. The device according to claim 6, wherein the energy converter comprises a generator driven by a turbine, and the working medium is passed in a closed circuit through the heat exchanger and the turbine.

8. The device according to claim 3, wherein the industrial installation comprises an industrial furnace.

9. A method for utilizing heat transported by a discontinuous flow of waste gas comprising the steps of:
   discharging the discontinuous flow of waste gas in phases with in each case constant starting values for the volume flow and for the temperature of an industrial installation,
   converting the discontinuous flow of waste gas into a continuous working flow with settable constant target values for the volume flow and the temperature, and
   converting the heat that is transported in the continuous working flow into useful mechanical or electrical or thermal energy;
   wherein, during a first phase in which the starting value of the volume flow is greater than its target value, a partial flow is removed from the flow of waste gas.

10. The method according to claim 9, wherein ambient air is supplied to the flow of waste gas.

11. The method according to claim 9, wherein the removed partial flow is directed through a heat-accumulating element and heat transported by the partial flow is thereby transferred to the element.

12. The method according to claim 11, wherein the partial flow to be supplied is directed through the heat-accumulating element and the heat accumulated in the element is thereby transferred to the partial flow.

13. The method according to claim 11, wherein the partial flows are directed in parallel through a number of heat-accumulating elements.

14. The method according to claim 9, wherein, during a second phase, in which the starting value of the volume flow is less than its target value, a partial flow is supplied to the flow of waste gas.

15. The method according to claim 9, wherein heat transported by the working flow is transferred to a working medium, which drives an energy converter.

16. The method according to claim 15, wherein the working medium circulates in a closed circuit and drives a turbine coupled to a generator.

17. The method according to claim 9, wherein the industrial installation comprises an industrial furnace.

18. The method according to claim 9, further comprising temperature and flow sensors coupled with the flow adjuster.

\* \* \* \* \*